United States Patent

Tanigawa et al.

Patent Number: 5,230,307
Date of Patent: Jul. 27, 1993

[54] INTERNAL COMBUSTION ENGINE HAVING ROTARY ENGINE BODY

[76] Inventors: Hiroyasu Tanigawa; Kazunaga Tanigawa; Yukinaga Tanigawa, all of 428-35, Enami, Okayama-shi, Okayama-ken, Japan

[21] Appl. No.: 950,007

[22] Filed: Sep. 24, 1992

[30] Foreign Application Priority Data

Oct. 7, 1991 [JP] Japan .................. 3-324990

[51] Int. Cl.⁵ .............................. F02B 53/00
[52] U.S. Cl. ........................ 123/45 A; 123/51 BC; 123/56 C; 60/624
[58] Field of Search ........... 123/45 R, 45 A, 51 B, 123/51 BA, 51 BC, 74 R, 74 B, 56 C; 60/624

[56] References Cited

U.S. PATENT DOCUMENTS

| | | | |
|---|---|---|---|
| 3,776,203 | 12/1973 | Joyce, Sr. | 123/56 C |
| 5,133,305 | 7/1992 | Tanigawa et al. | 123/54 |

FOREIGN PATENT DOCUMENTS

| | | | |
|---|---|---|---|
| 0135326 | 8/1983 | Japan | 123/45 A |
| 0200036 | 11/1983 | Japan | 123/45 A |
| 0039932 | 3/1984 | Japan | 123/45 A |
| 0079821 | 4/1986 | Japan | 123/45 A |
| 0079822 | 4/1986 | Japan | 123/45 A |
| 2308925 | 12/1990 | Japan | 123/45 A |

Primary Examiner—Richard A. Bertsch
Assistant Examiner—Charles G. Freay
Attorney, Agent, or Firm—Marks & Murase

[57] ABSTRACT

An internal combustion engine comprises a hollow rotary engine body, an axially opposite pair of main pistons capable of rotating with but slidably reciprocating relative to the engine body, a cam mechanism for causing the main pistons to make one full rotation with the engine body as the piston makes two reciprocations, and a pair of axially fixed auxiliary pistons coaxially inserted into the respective main pistons. A main combustion chamber is formed in the engine body between the main pistons, whereas a pair of auxiliary combustion chambers are formed in the respective auxiliary pistons. Explosive combustion takes place alternately in the main combustion chamber and each auxiliary combustion chamber.

14 Claims, 11 Drawing Sheets

INTERNAL COMBUSTION ENGINE HAVING ROTARY ENGINE BODY

BACKGROUND OF THE INVENTION

1. Field of the Invention

This invention relates generally to internal combustion engines. More particularly, the invention relates to an internal combustion engine of the type wherein an engine body itself is rotated to drive an output shaft.

2. Description of the Prior Art

As is well known, most of the conventional internal combustion engines equally incorporate a crank mechanism for converting piston reciprocation into rotation of the output shaft. Such a crank mechanism has been found to result in a non-negligible energy loss.

In view of the above problem, U.S. Pat. No. 5,133,305 of the same inventors discloses an internal combustion engine in which a pair of pistons are made to rotate with a cylindrical engine body as the pistons reciprocate in response to explosive combustion occurring in a combustion chamber between the pistons. The rotation of the engine body is directly transmitted to an output shaft without requiring a crank mechanism.

Specifically, the engine body disclosed in the above U.S. patent is rotatably received in a pair of cam cylinders, and has two pairs of longitudinal guide slots. The respective pistons have guide projections slidably guided by the longitudinal guide slots of the engine body, so that the pistons are rotatable with but slidably reciprocatable relative to the engine body. Each cam cylinder is internally formed with a curved cam groove, whereas each piston carries a pair of piston pins penetrating through the longitudinal guide slots to fit into the cam groove. The cam groove have such a profile that the piston makes one full rotation with the engine body as the piston makes two reciprocations.

Obviously, the prior art engine described above requires no crank mechanism, and therefore has an advantage of being higher in energy efficiency than the conventional reciprocating engines. Further, the rotation of the engine body causes air within the combustion chamber to rotate, so that the air can be forcibly and uniformly mixed with the fuel to provide an enhanced combustion efficiency.

However, in the prior art engine, explosive combustion takes place only at the upper deadpoint of piston reciprocation, and the pistons must move inertially from the lower deadpoint to the upper deadpoint. Thus, there is a limitation in increasing the engine output per unit cylinder volume.

SUMMARY OF THE INVENTION

It is, therefore, a primary object of the present invention to provide an internal combustion engine which has a rotary engine body, and wherein explosive combustion occurs both at the upper and lower deadpoints of piston reciprocation increase the engine output per unit cylinder volume.

Another object of the present invention is to provide an internal combustion engine which has a rotary engine body, and which is capable of effectively recovering the heat and flow energy of exhaust gas for assisting rotating of the engine body, thereby increasing the thermal efficiency of the engine.

A further object of the present invention is to provide an internal combustion engine which has a rotary engine body, and which ensures smooth piston reciprocation.

Still another object of the present invention is to provide an internal combustion engine which has a rotary engine body, and which incorporates an effective cooling system.

According to the present invention, there is provided an internal combustion engine comprising: a rotary engine body having a piston housing bore; an axially opposed pair of hollow main pistons disposed within the bore of the engine body to define a main combustion chamber between the pair of main pistons, the main pistons being rotatable with the engine body but slidably reciprocatable between upper and lower deadpoints relative to the engine body, the main pistons respectively carrying cam follower means extending transversely through the engine body; hollow cam carrier means rotatably receiving the engine body, the cam carrier means internally having a pair of curved cam grooves receiving the respective cam follower means of the main pistons for causing the main pistons to make one full rotation with the engine body as the main pistons make two reciprocations; a pair of axially fixed auxiliary pistons arranged on both sides of the main combustion chamber, the auxiliary pistons being inserted into the respective main pistons to define a pair of auxiliary combustion chambers within the respective main pistons; gas supply means for supplying compressed gas alternately into the main combustion chamber and into the auxiliary combustion chambers; and exhaust means for allowing exit of exhaust gas alternately from the main combustion chamber and from the auxiliary combustion chambers.

The term "gas" is used herein to include both "air" alone and "air-fuel mixture". Thus, the "gas supply means" referred to above may supply compressed "air" alone or a compressed "air-fuel mixture". In the former case, separate fuel supply means is required to form a air-fuel mixture after entry into the respective combustion chambers. In the latter case, on the other hand, no separate fuel supply means is necessary because the air-fuel mixture is prepared before entry into the respective combustion chambers.

Other objects, features and advantages of the present invention will be fully understood from the following detailed description given with reference to the accompanying drawings.

DETAILED DESCRIPTION OF THE PREFERRED EMBODIMENT

Figure 1:
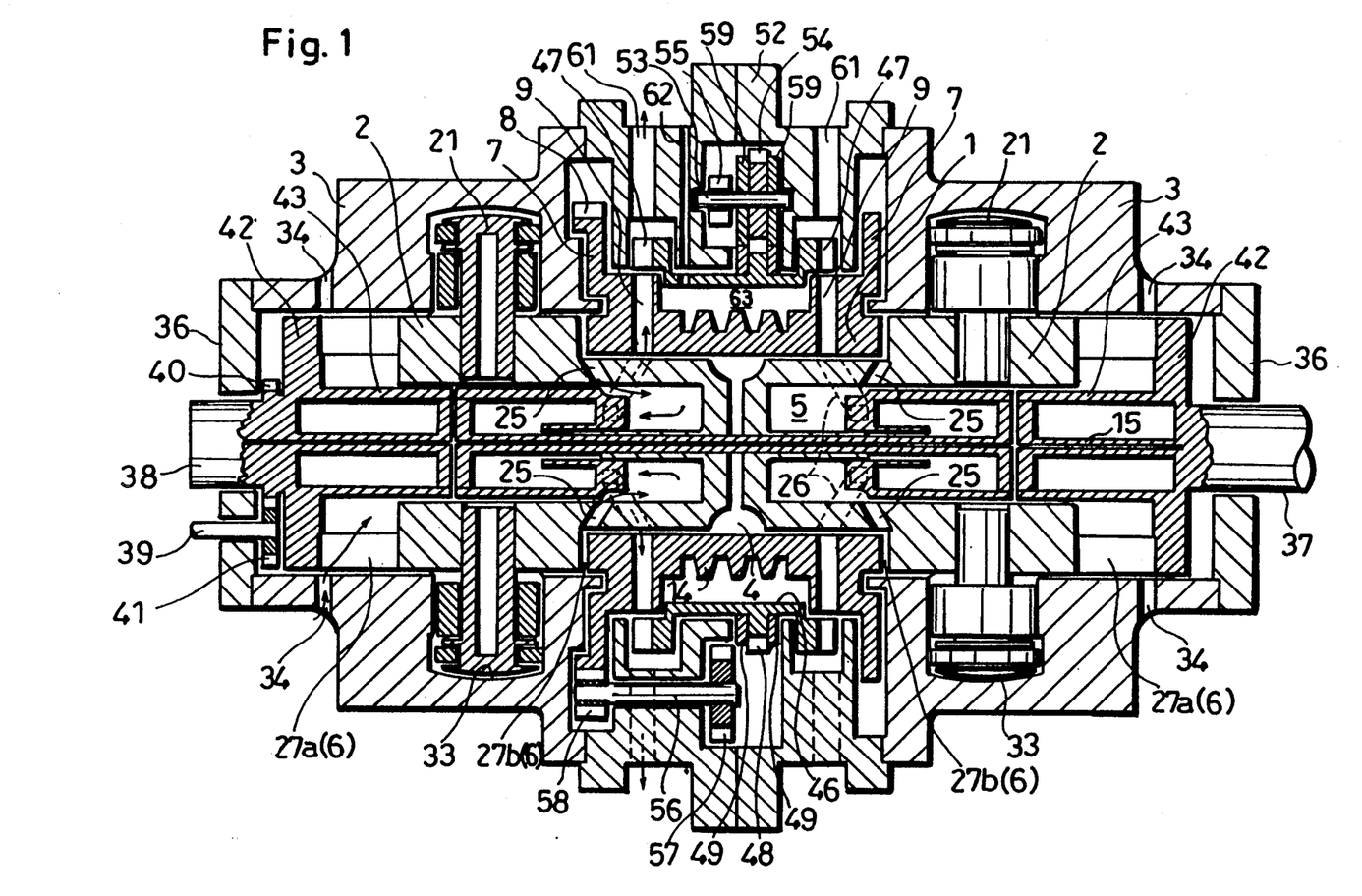
FIG. 1 is a view, in longitudinal section, showing an internal combustion engine according to the present invention with main pistons moved to the upper deadpoint.
Figure 2:
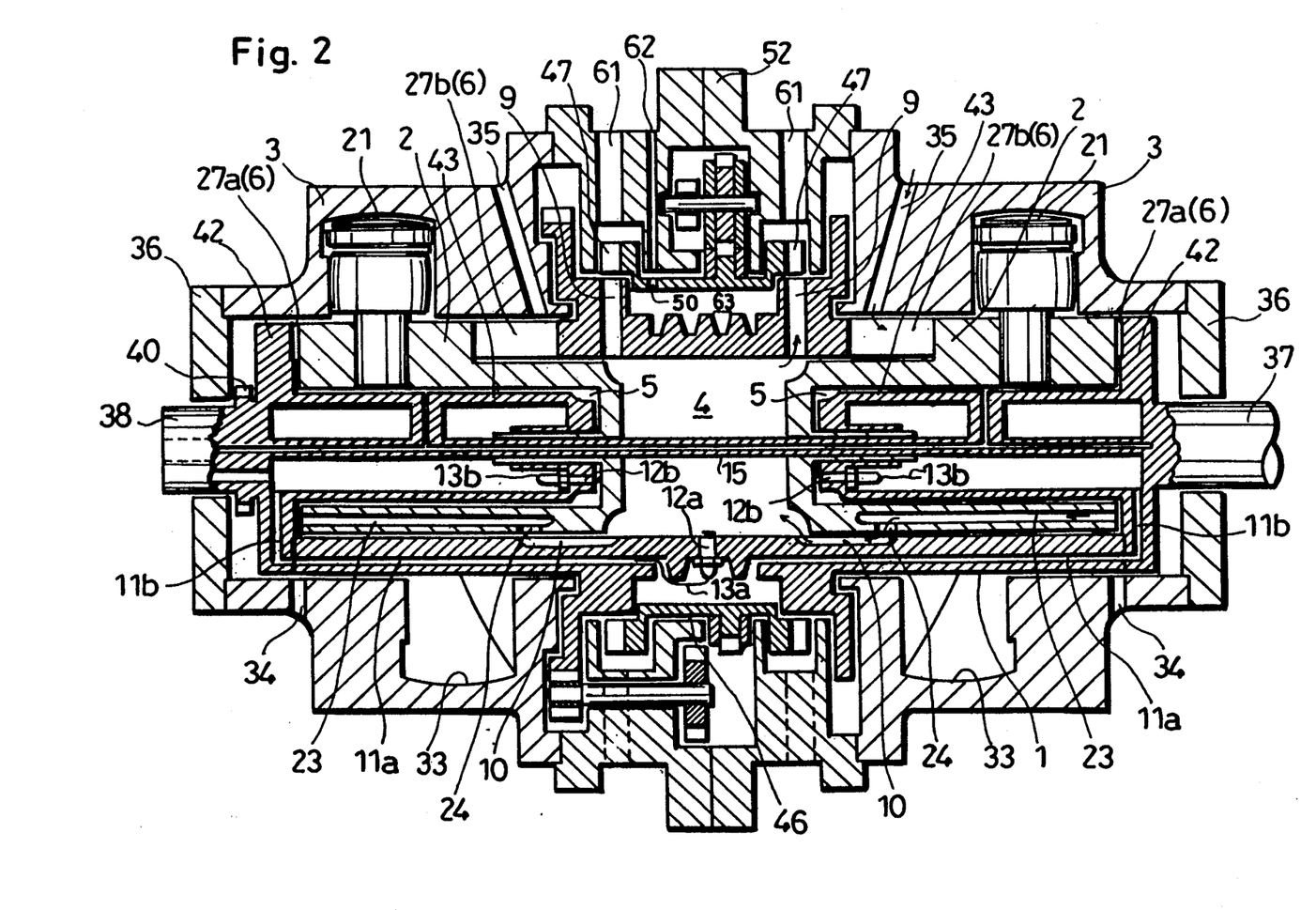
FIG. 2 is a sectional view similar to FIG. 1 but showing the engine with the main pistons moved to the lower deadpoint.

Referring first to FIGS. 1 and 2 of the accompanying drawings, there is illustrated an internal combustion engine according to the present invention. The illustrated engine mainly comprises a generally cylindrical engine body 1, an axially opposite pair of hollow main pistons 2 slidably guided by the engine body, a pair of fixed cam cylinders 3 fitted around the engine body in corresponding relation to the respective main pistons. The engine body 1 corresponds to an engine cylinder of a conventional internal combustion engine, but differs therefrom in that the engine body itself is rotatable.

A central combustion chamber 4 (see FIG. 2) is formed within the engine body 1 between the respective main pistons 2, whereas a pair of auxiliary combustion chambers 5 (see FIG. 1) are formed within the respective main pistons 2. Thus, three combustion chambers are provided in the single engine cylinder according to the present invention.

Figure 3:
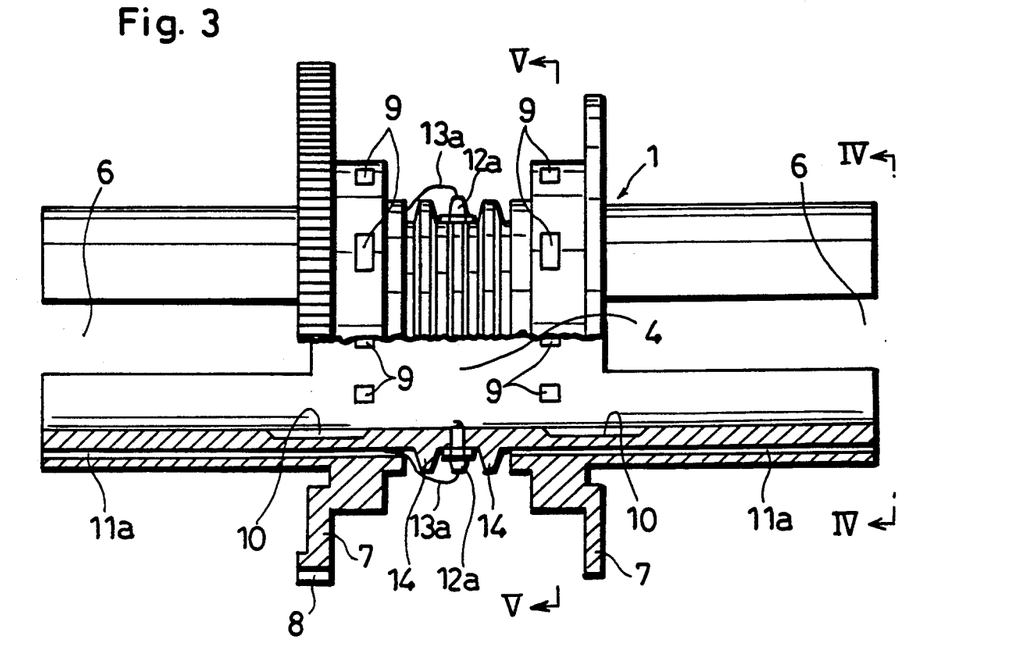
FIG. 3 is a plan view, partly cut away, showing an engine body.
Figure 4:
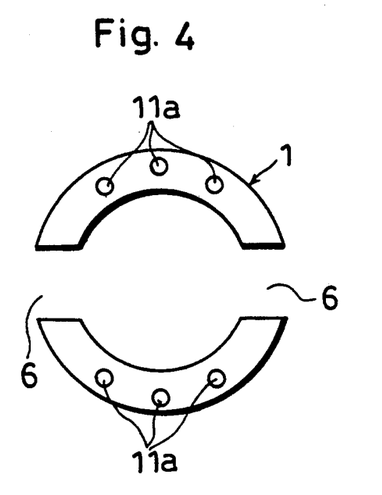
FIG. 4 is an end view of the engine body as seen in the direction of arrows IV—IV in FIG. 3.
Figure 5:
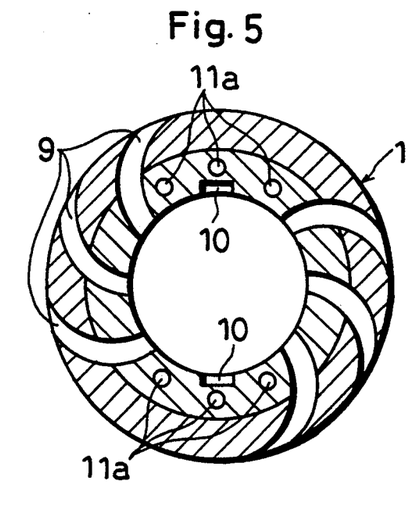
FIG. 5 is a sectional view of the engine body taken on lines V—V in FIG. 3.

As shown in FIGS. 3 through 5, each end of the engine body 1 is formed with a diametrically opposite pair of axial guide slots 6 for slidably guiding the corresponding piston 2. A non-slotted central portion of the engine body is externally formed with a pair of axially spaced annular thrust flanges 7. One of the thrust flanges 7 is integrally formed with an annular driven gear 8.

The engine body 1 is also formed with two annular series of main exhaust ports 9 between but close to the respective thrust flanges 7. These exhaust ports 9 communicate with the central combustion chamber 4 when the main pistons 2 approach the lower deadpoint of reciprocation (FIG. 2).

As best shown in FIG. 5, each of the main exhaust port 9 penetrates the wall thickness of the engine body 1 along an involute curve. Thus, the exhaust gas having passed through the exhaust port produces a rotational force to assist rotation of the engine body 1.

The engine body 1 is internally formed with main scavenging passages 10 in the form of grooves extending axially of the engine body. These scavenging passages 10 communicate with the main combustion chamber 4 when the respective main pistons 2 approach the lower deadpoint (see FIG. 2).

The cylindrical wall of the engine body 1 is provided with axial passages 11a extending axially from each end to the central portion of the engine body. These axial passages 11a are open at the central portion of the engine body 1 and used for passing cooling air, as described hereinafter. Further, selected ones of the axial passages 11a are also used for passing electrical wirings 13a for ignition plugs 12a mounted on the central portion of the engine body 1. Indicated by reference numeral 14 are cooling fins formed externally on the central portion of the engine body.

The respective main pistons 2 are slidably fitted on a lubricant supply pipe 15. The two main pistons 2 are identical to each other.

As shown in FIGS. 6 through 9, each of the main pistons 2 has an inner tube for slidably fitting on the lubricant supply pipe 15 (FIGS. 1 and 2), an outer tube 17, and an annular piston head 18. The corresponding auxiliary combustion chamber 5 is defined by the inner tube 16, outer tube 17 and the piston head 18.

Figure 6:
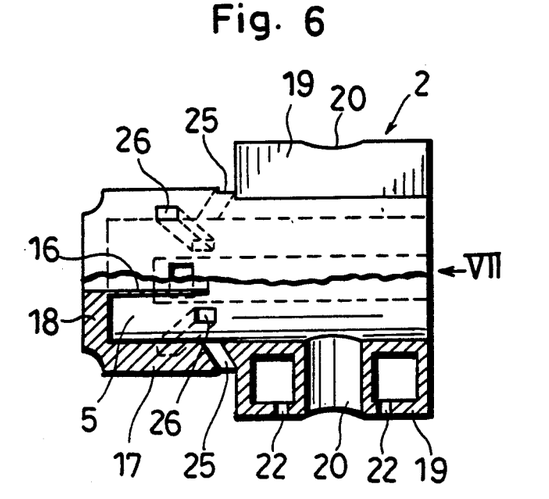
FIG. 6 is a side view, partly cut away, showing one of the main pistons.
Figure 7:
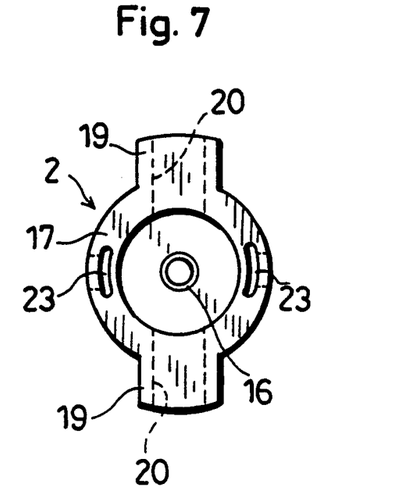
FIG. 7 is a rear view of the same main piston as seen in the direction of an arrow VII in FIG. 6.
Figure 8:
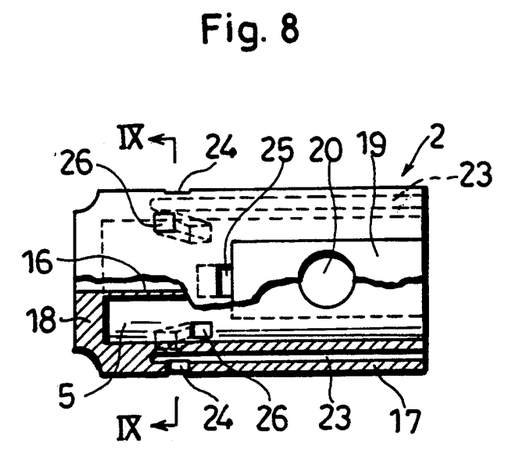
FIG. 8 is a plan view, partially cut away, showing the same main piston.
Figure 9:
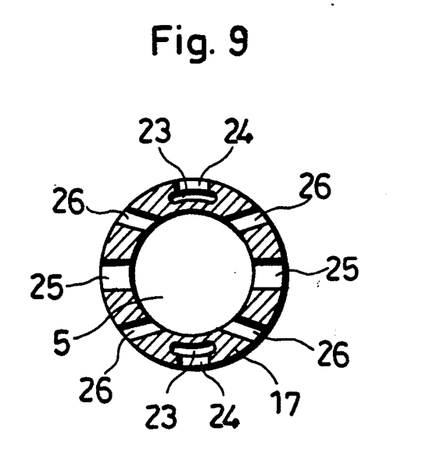
FIG. 9 is a sectional view taken along lines IX—IX in FIG. 8.

The outer tube 17 of the main piston 2 is integrally formed with a diametrically opposite pair of box-like guide projections 19 which are fittable into the corresponding pair of guide slots 6 of the engine body 1 (see FIGS. 1 and 3). Thus, the main piston is axially slidable relative to but rotatable with the engine body. Each of the respective guide projections 19 is formed with a transverse tube 20 for receiving a piston pin 21 (FIGS. 1 and 2). Preferably, the guide projection 19 may be provided with weight reducing holes 22, as shown in FIG. 6.

The outer tube 17 of the main piston 2 is also provided, in its wall thickness, with a diametrically opposite pair of axial main gas supply passages 23. These gas supply passages 23 communicate with the respective scavenging passages 10 of the engine body 1 (FIG. 2) through respective main gas supply ports 24. Thus, the main gas supply passages 23 and main gas supply ports 24 are used for supplying an air-mixture into the central combustion chamber 4 and for scavenging it.

Further, the outer tube 17 of the main piston 2 is provided with auxiliary gas supply ports 25 and auxiliary exhaust ports 26. The auxiliary gas supply ports 25 and auxiliary exhaust ports 26 extend obliquely through the outer tube 17 and communicate with the corresponding auxiliary combustion chamber 5 when the main piston 2 approaches the upper deadpoint (FIG. 1). The auxiliary exhaust ports 26 also communicate with the corresponding main exhaust ports 9 of the engine body 1 when the main piston 2 moves to the upper deadpoint (FIG. 1).

As clearly shown in FIGS. 1 and 2, each guide slot 6 of the engine body 1 is divided by the corresponding guide projection 19 of the main piston 2 into a main gas supply chamber 27a and an auxiliary gas supply chamber 27b. The main gas supply chamber 27a communicates with the main combustion chamber 4 through the corresponding axial main gas supply passage 23 and main gas supply port 24 of the main piston 2 and the corresponding scavenging passage 10 of the engine body 1 when the main piston makes its stroke toward the lower deadpoint (FIG. 2). The auxiliary gas supply chamber 27b communicates with the corresponding auxiliary combustion chamber 5 through the corresponding auxiliary gas supply port 25 of the main piston 2 when the main piston makes its stroke toward the upper deadpoint (FIG. 1). It should be appreciated that the main gas supply chamber 27a includes not only a portion of the guide slot 6 behind the main piston 2 but also an annular space behind the main piston, whereas the auxiliary gas supply chamber 27b includes only a portion of the guide slot 6 ahead of the main piston 2.

Figure 10:
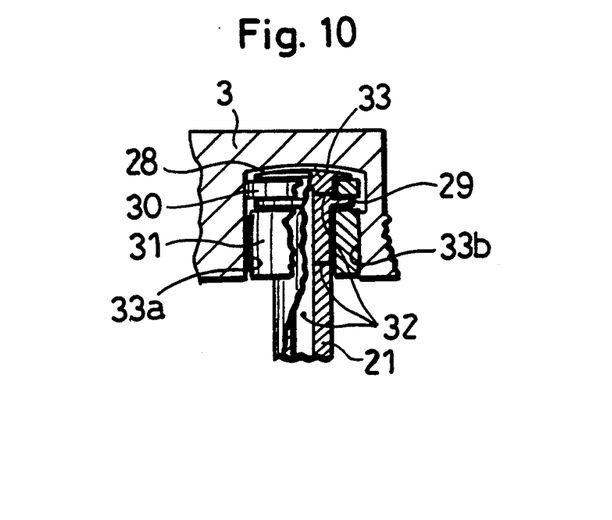
FIG. 10 is a view, partly in section, showing a piston pin.

Each piston pin 21 functions as a cam follower which is cooperative with the corresponding cam cylinder 3, as described hereinafter. As best shown in FIG. 10, the piston pin is tubular, and has a radially outer end formed with a first thrust bearing flange 28 which resembles an umbrella. The piston pin further has a second thrust bearing flange 29 slightly spaced from the first thrust bearing flange.

A first roller 30 is rotatably fitted on the piston pin 21 between the first and second thrust bearing flanges 28, 29. A second roller 31 is also fitted on the piston pin inwardly of the second thrust bearing flange 29. The first roller 30 is slightly larger in diameter than the second roller 31 for the purpose to be described later. Indicated at 32 are lubrication ports suitably formed in the wall thickness of the piston pin.

Each cam cylinder 3 is fitted around the corresponding slotted end portion of the engine body 1, as shown in FIGS. 1 and 2. The cam cylinder is internally formed with a cam groove 33 for receiving the rollers 30, 31 of the respective piston pins 21. The cam groove is curved substantially along a sinous curve, so that the corresponding main piston 2 together with the engine body 1 makes one full rotation as the main piston makes two reciprocations. The cam cylinder may be made to have two axially separable portions 3a, 3b (see FIG. 11) for facilitating assembly.

Figure 11:
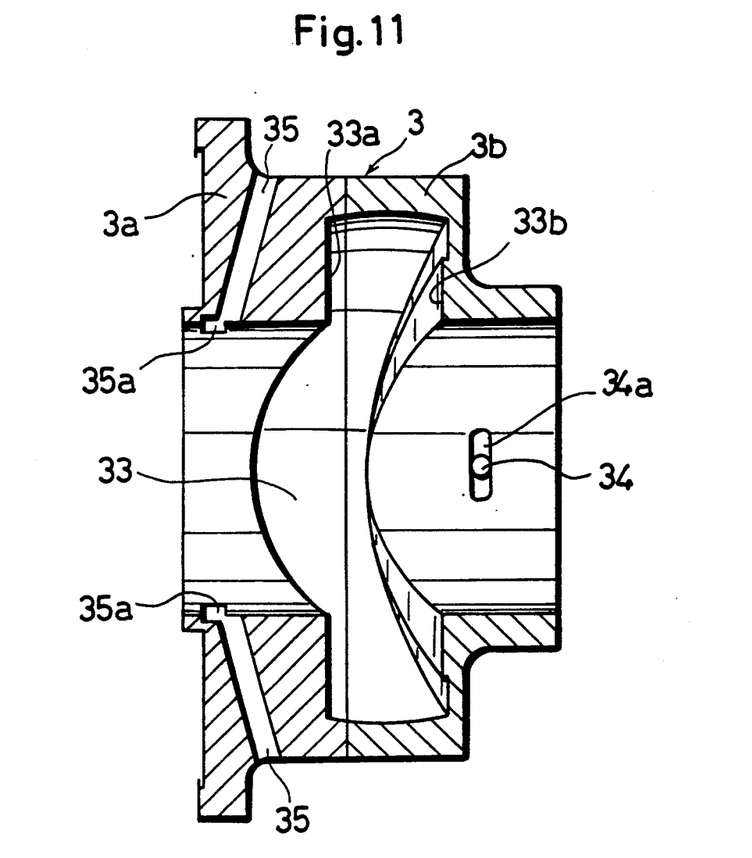
FIG. 11 is a sectional view showing a cam cylinder.

As better shown in FIGS. 10 and 11, the cam groove 33 has an inner track (inner lateral surface) 33a and an outer track (outer lateral surface) 33b. The inner track 33a comes into contact only with the first roller 30 of each piston pin 21, whereas the outer track 33b is slightly stepped to come into contact with the second roller 31 only. As described before, the first roller 30 is diametrically larger than the second roller 31. It is this diametrical difference that enables such a differential contact of the respective rollers relative to the respective cam tracks.

It is now supposed that the piston pin 21 carries only a single roller. In such an arrangement, the roller must pressingly contact alternately with the respective tracks 33a, 33b of the cam groove 33, and alternation occurs upon every change in reciprocating direction of the main piston 2. However, the inner and outer cam tracks 33a, 33b cause the roller to rotate in the opposite directions as long as the main piston 2 keeps on rotating in one direction. Thus, a great friction occurs between the roller and the respective cam tracks upon every change in reciprocating direction of the piston, thereby impairing smooth operation of the engine and resulting in a great energy loss.

According to the illustrated embodiment, the first roller 30 contacts only the inner cam track 33a and keeps on rolling only in one direction, whereas the second roller 31 contacts only the outer cam track 33b and keeps on rolling only in the opposite direction. Thus, the main piston 2 is capable of smoothly rotating and reciprocating with a greatly reduced frictional energy loss. Further, the use of two rollers 30, 31 for each piston pin 21 is preferred to reduce the bearing burden on each roller.

The cam cylinder 3 is formed with a pair of main gas suction ports 34 positioned axially outwardly of the cam groove 33 (see FIGS. 1 and 11), and a pair of auxiliary gas suction ports 35 positioned axially inwardly of the cam groove 33. The main gas suction ports 34 communicate with the respective main gas supply chambers 27a when the respective guide slots 6 of the engine body 1 overlap the main suction ports; that is, when the corresponding main piston 2 approaches the upper deadpoint of reciprocation, as shown in FIG. 1. On the other hand, the auxiliary gas suction ports 35 communicate with the respective auxiliary gas supply chambers 27b when the corresponding main piston 2 approaches the lower deadpoint of reciprocation, as shown in FIG. 2.

As shown in FIG. 11, the respective main gas suction ports 34 have radially inner ends or valve openings 34a which are elongated circumferentially of the cam cylinder 3 to suitably cooperate with the rotating engine body 1 for opening and closing the main gas suction ports 34. Similarly, the respective auxiliary gas suction ports 35 have radially inner ends or valve openings 35a which are also elongated circumferentially of the cam cylinder for opening and closing the auxiliary gas suction ports 35. The valve openings 34a for the main gas suction ports 34 are angularly spaced 90° from the valve openings 35a for the auxiliary gas suction ports 35, so that the two kinds of gas suction ports 34, 35 are opened and closed alternately as the engine body 1 rotates. The circumferential length of the respective valve openings 34a, 35a may be determined depending on various engine requirements.

The pair of cam cylinders 3 have their respective axially outer ends closed by a pair of closure plates 36. One of the closure plates 36 (right one in FIGS. 1 and 2) is rotatably penetrated by a main output shaft 37 to take out the engine drive power, whereas the other closure plate (left one in FIGS. 1 and 2) is rotatably penetrated by a drive shaft 38 and an auxiliary output shaft 39. The drive shaft 38 is integral with a drive gear 40 which is in mesh with a driven gear 41 carried by the auxiliary output shaft 39. The auxiliary output shaft 39 is used for driving unillustrated auxiliary parts such as a lubricant supply pump.

The main output shaft 37 is integral with an end lid 42 attached to one end (right end in FIGS. 1 and 2) of the engine body 1 for rotation therewith. Similarly, the drive shaft 38 is integral with another end lid 42 attached to the other end (left end in FIGS. 1 and 2) of the engine body for rotation therewith. The respective end lids 42 are substantially identical in configuration.

As illustrated in FIGS. 1, 2 and 12-17, each of the end lids 42 is formed integrally with a hollow auxiliary piston 43 which is inserted into the corresponding main piston 2, so that the corresponding auxiliary combustion chamber 5 is formed within the main piston. The auxiliary piston 43 has a separable piston head 43a which carries ignition plugs 12b associated with the auxiliary combustion chamber 5 and connected to relevant wirings 13b. The piston head 43a has an inner tube 43b for slidably receiving the inner tube 16 of the main piston 2 (FIGS. 1 and 2).

Further, each of the end lids 42 is internally formed with radial passages 11b connected to the axial passages 11a of the engine body 1 via bent connecting portions 11c and communicating with the interior of the corresponding auxiliary piston 43 (see FIGS. 2, 12, and 14-16). These radial passages 11b together with the axial passages 11a of the engine body are used for passing the wirings 13a, 13b of the respective ignition plugs 12a, 12b (see also FIG. 3) and for allowing passage of cooling air into the auxiliary piston.

Figure 12:
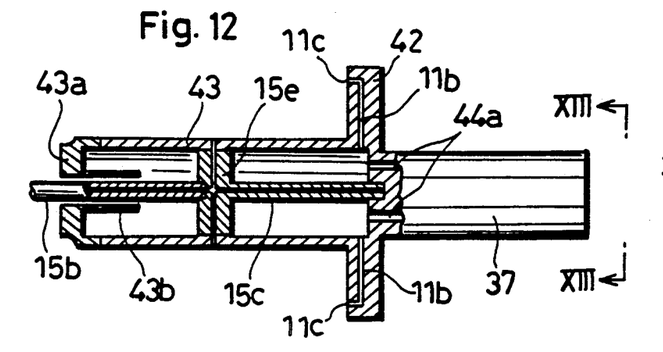
FIG. 12 is a side view, partially in section, showing one of two auxiliary pistons.
Figure 13:
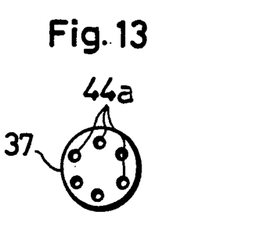
FIG. 13 is an end view of the same auxiliary piston as seen in the direction of arrows XIII—XIII in FIG. 12.

As shown in FIGS. 12 and 13, the main output shaft 37 is provided with axial bores 44a communicating with the interior of the corresponding auxiliary piston 43. All of these axial bores 44a serve only to discharge cooling air from the interior of the auxiliary piston to the exterior.

Figure 16:
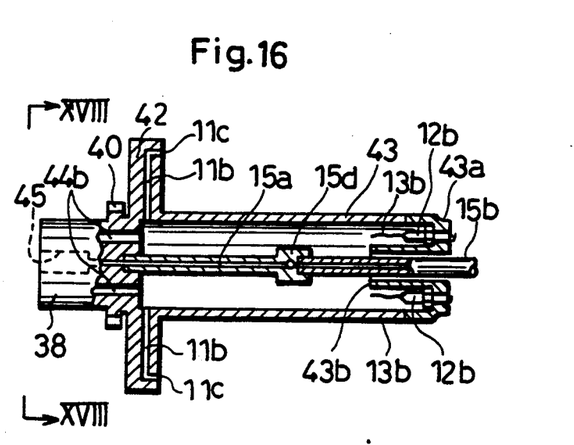
FIG. 16 is a plan view, partially in section, showing the other auxiliary piston.
Figure 17:
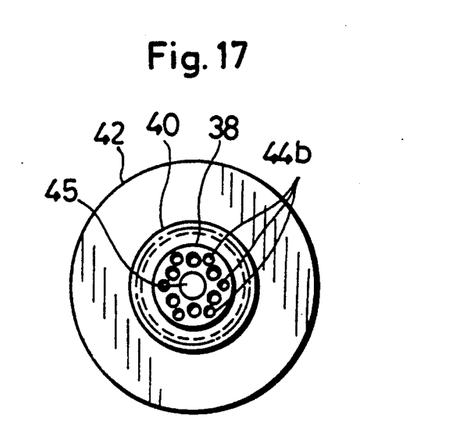
FIG. 17 is a rear view of the auxiliary piston as seen in the direction of arrows XVII—XVII in FIG. 16.

Similarly, the drive shaft 38 is also provided with axial bores 44b communicating with the interior of the corresponding auxiliary piston 43, as shown in FIGS. 16 and 17. All of these axial bores 44b serve to discharge cooling air from the interior of the auxiliary piston to the exterior. Further, selected ones of the axial bores 44b are also used to introduce the wirings 13a, 13b for the respective ignition plugs 12a, 12b (see also FIGS. 2 and 3).

Figure 14:
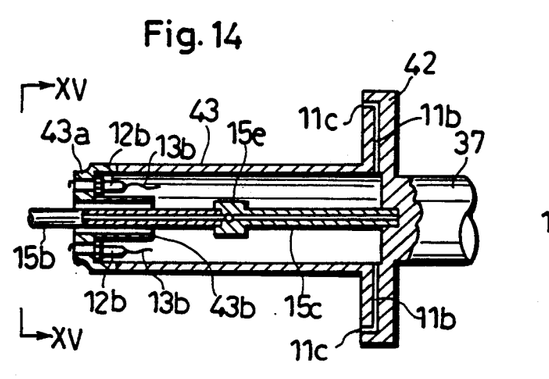
FIG. 14 is a plan view, partially in section, showing the same auxiliary piston.
Figure 15:
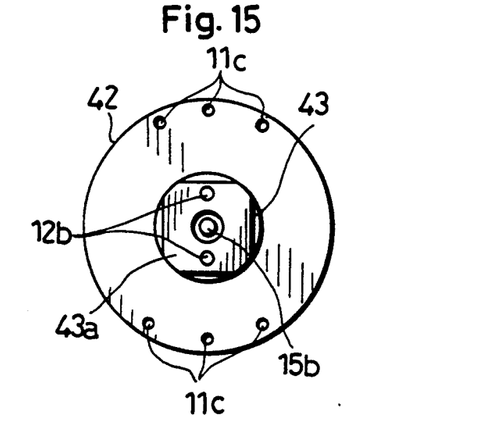
FIG. 15 is a front view of the same auxiliary piston as seen in the direction of arrows XV—XV in FIG. 14.

As shown in FIGS. 1 and 2, the lubricant supply pipe 15 extends all the way from the drive shaft 38 to the main output shaft 37. In the illustrated embodiment, the pipe 15 has three separable pipe portions 15a, 15b, 15c joined in series via two branching connectors 15d, 15e, as shown in FIGS. 12, 14 and 16. Such separable connection of the pipe portions 15a-15c is preferred for facilitating assembly.

The drive shaft 38 is provided with a lubricant inlet 45 (FIG. 16) connected to the lubricant supply pipe 15 and an unillustrated lubricant source. Thus, the lubricant supplied from the inlet 45 flows into the supply pipe 15 and exits radially out of the respective auxiliary pistons 43 under centrifugal force for lubricating various parts of the engine.

As shown in FIGS. 1, 2, 18 and 19, an exhaust turbine 46 is rotatably arranged around the central portion of the engine body 1. The turbine has two annular series of turbine blades 47 arranged to surround the respective annular series of exhaust ports 9 of the engine body (see FIGS. 1 and 2), so that the turbine is rotated by the whirling exhaust gas which has passed through the exhaust ports 9. The turbine further has an annular drive gear 48 which is directly flanked by a pair of bearing annuli 49. Each bearing annulus 49 has an outer diameter substantially corresponding to the pitch diameter of the drive gear 48. Indicated at 50 are cooling air inlet openings for allowing entry of cooling air into an annular cooling chamber 63 between the engine body 1 and the turbine 46.

Figure 20:
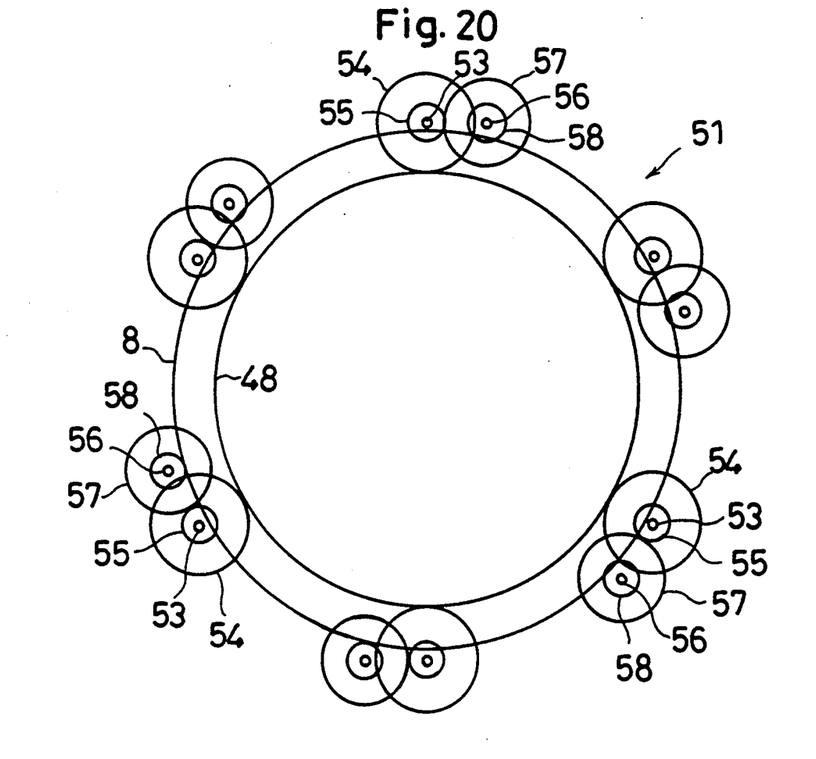
FIG. 20 is a schematic view showing a transmission gear mechanism associated with the exhaust turbine.
Figure 21:
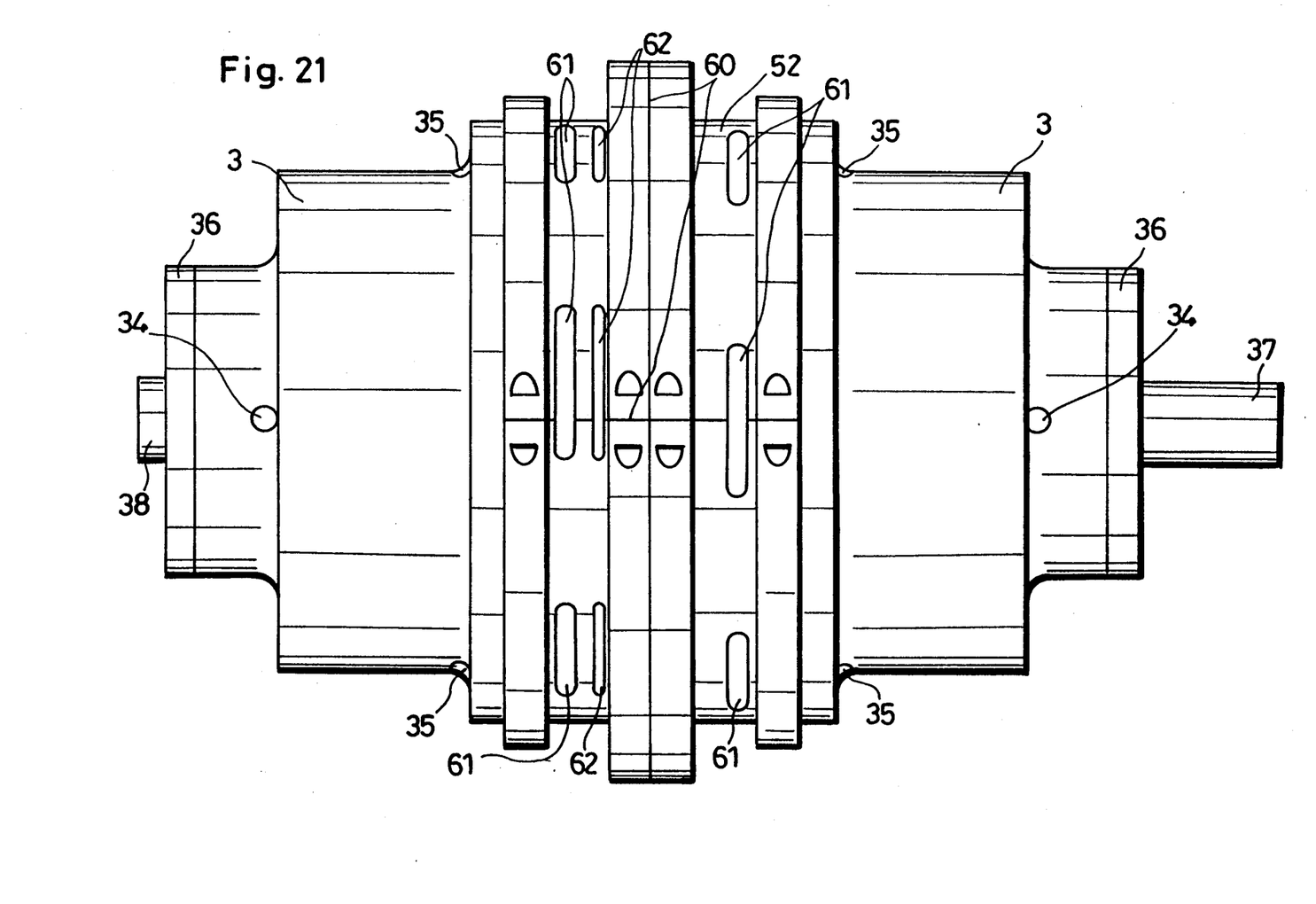
FIG. 21 is a side view showing the entire outer appearance of the engine.

Rotation of the exhaust turbine 46 is retrospectively transmitted to the engine body 1 by way of a transmission gear mechanism 51 (FIG. 20). The exhaust turbine 46 and the transmission gear mechanism 51 are housed in a gear casing 52 (FIGS. 1, 2 and 21).

As shown in FIGS. 1, 2, and 20, the transmission gear mechanism 51 includes a first group of shafts 53 (six in the illustrated embodiment) rotatably supported on the gear casing 52. Each of the first group shafts 53 carries a first transmission gear 54 in mesh with the drive gear 48 of the turbine 46, and a second transmission gear 55. Further, the transmission gear mechanism 51 also includes a second group of shafts 56 (also six in the illustrated embodiment) rotatably supported on the gear casing 52. Each of the second group shafts 56 carries a third transmission gear 57 in mesh with the second transmission gear 55 (FIG. 12), and a fourth transmission gear 58 in mesh with the annular driven gear 8 of the engine body 1.

According to the illustrated embodiment, the exhaust turbine 46 is rotated in the opposite direction relative to the engine body 1 by the exhaust gas. Such rotation of the turbine is in turn utilized to drive the engine body through the transmission gear mechanism 51. Thus, the heat and flow energy of the exhaust gas is effectively recovered to increase the output of the engine. Further, the turbine can also function as a flywheel for the engine, and no separate flywheel is necessary, as opposed to the conventional reciprocating engine.

The reduction ratio provided by the transmission gear mechanism 51 may be optionally selected. If the reduction ratio is set at 10:1 for example, the exhaust turbine 46 rotates at 10,000 rpm when the engine body 1 rotates at 1,000 rpm for example. Such a high reduction ratio is preferred to greatly reduce the required weight of the exhaust turbine as compared to a conventional flywheel of the same size (its weight being about 100 times larger), thereby making it possible to use a non-metallic material (e.g. ceramic) for the exhaust turbine.

As shown in FIGS. 1 and 2, each of the first group shafts 53 further carries a pair of bearing rings 59 on both sides of the corresponding first transmission gear 54. The respective bearing rings 59 have an outer diameter substantially corresponding to the pitch diameter of the first transmission gear 54, and are held in rolling contact with the respective bearing annuli 49 of the turbine 46.

The combination of the bearing rings 59 and the bearing annuli 49 prevents the turbine 46 from displacing axially and radially. Thus, the turbine can be held floating around the engine body 1 without requiring to provide a bearing between the turbine and the engine body.

As shown in FIGS. 1, 2 and 21, the gear casing 52 is interposed between and coupled to the pair of cam cylinders 3. Preferably, the casing 52 comprises four separable parts joined together into a cylindrical form along axial and circumferential joining lines 60, thereby facilitating assembly of the interior components. Further, the casing 52 is provided with two annular series of discharge ports 61 in communication with the respective series of main exhaust ports 9 of the engine body 1 to enable discharge of the exhaust gas after driving the turbine 46. Represented by reference numeral 62 is an annular series of cooling air intake ports for introducing external air into the cooling chamber 63 between the engine body 1 and the turbine 46 through the cooling air inlet openings 50 (see FIGS. 1, 2 and 18) of the turbine.

Though not specifically illustrated, suitable seals (including rubber packings, oil seals, labyrinth seals and so on) are provided for those portions which require gas tightness, and suitable bearings are provided for various rotary parts. Further, the respective gas suction ports 34, 35 of the cam cylinders 3 (FIGS. 1, 2, 11 and 21) are connected to unillustrated carburetors for feeding a suitable air-fuel mixture into the respective combustion chambers 4, 5 in timed relation to the reciprocation of the main pistons 2.

The engine according to the embodiment described above operates in the following manner.

Engine Start

The engine operation is started by actuating an unillustrated starter which is connected to the main output shaft 37 (FIGS. 1 and 2). The engine body 1 together with each main piston 2 makes one full rotation as the main pistons make two reciprocations, as already described. FIG. 1 shows the upper deadpoint of the piston reciprocation, whereas FIG. 2 represents the lower deadpoint.

Upper Deadpoint

At or near the upper deadpoint of FIG. 1, an amount of air-fuel mixture previously introduced and compressed in the main combustion chamber 4 is ignited by sparks from the ignition plugs 12a for explosive combustion. Further, a new supply of air-fuel mixture is introduced into the respective main gas supply chambers 27a through the respective main gas suction ports 34 because the end valve openings 34a (FIG. 11) of the main gas suction ports 34 overlap the respective guide slots 6 of the engine body 1 at or near the upper deadpoint.

On the other hand, an amount of air-fuel mixture previously compressed in the auxiliary gas supply chambers 27b is introduced into the respective auxiliary combustion chambers 5 through the auxiliary gas supply ports 25 at or near the upper deadpoint of FIG. 1. At this time, the exhaust gas is expelled from the auxiliary combustion chambers 5 through the auxiliary ports 26 and the main exhaust ports 9 to drive the exhaust turbine 46.

Piston Movement Toward Lower Deadpoint

The explosive combustion occurring within the main combustion chamber 4 causes the respective main pistons 2 to move toward the lower deadpoint of FIG. 2.

When the respective main pistons 2 start moving toward the lower deadpoint, the main gas suction ports 34 are closed because of rotational displacement of the engine body 1, so that the air-fuel mixture previously introduced into the respective main gas supply chambers 27a is compressed. Further, the auxiliary gas supply ports 25 and auxiliary exhaust ports 26 of the respective main pistons 2 are closed, so that the air-fuel mixture previously introduced into the respective auxiliary combustion chambers 5 is also compressed.

When the respective main pistons 2 approach the lower deadpoint, the main exhaust ports 9 and scavenging passages 10 of the engine body 1 are opened almost simultaneously or with a slight time lag. As a result, the air-fuel mixture, which has been previously compressed to a very high extent within the respective main gas supply chambers 27a, is forcibly introduced under high pressure into the main combustion chamber 4 through the main gas supply passages 23, the main gas supply ports 24 and the scavenging passages 10 to expel the exhaust gas from the main combustion chamber 4 through the main exhaust ports 9, thereby driving the exhaust turbine 46. Further, the end valve openings 35a of the auxiliary gas suction ports 35 overlap the guide slots 6 of the engine body 1 due to rotational displacement thereof to introduce a new supply of air-fuel mixture into the respective auxiliary gas supply chambers 27b.

Lower Deadpoint

At or near the lower deadpoint of FIG. 2, the air-fuel mixture previously compressed in the respective auxiliary combustion chambers 5 is ignited by sparks from the relevant ignition plugs 12b for explosive combustion.

Piston Movement Toward Upper Deadpoint

The explosive combustion occurring within the respective auxiliary combustion chambers 5 causes the respective main pistons 2 to move toward the upper deadpoint of FIG. 1.

When the respective main pistons 2 start moving toward the upper deadpoint, the auxiliary gas suction ports 35 are closed because of rotational displacement of the engine body 1, so that the air-fuel mixture previously introduced into the respective auxiliary gas supply chambers 27b is compressed. Further, the main exhaust ports 9 and the scavenging passages 10 are closed, so that the air-fuel mixture previously introduced into the main combustion chamber 4 is also compressed.

When the respective main pistons 2 approach the upper deadpoint, the auxiliary gas supply ports 25 and auxiliary exhaust ports 26 of the main pistons 2 are opened almost simultaneously or with a slight time lag. As a result, the air-fuel mixture, which has been previously compressed to a very high extent within the respective auxiliary gas supply chambers 27b, is forcibly introduced under high pressure into the respective auxiliary combustion chambers 5 through the auxiliary gas supply ports 25 to expel the exhaust gas from the auxiliary combustion chambers 5 through the auxiliary exhaust ports 26 and the main exhaust ports 9, thereby driving the exhaust turbine 46. Further, the end valve openings 34a of the main gas suction ports 34 overlap the guide slots 6 of the engine body 1 due to rotational displacement thereof to introduce a new supply of air-fuel mixture into the respective main gas supply chambers 27a.

The engine according to the illustrated embodiment operates constantly by repeating the above cycle wherein explosive combustion takes place at both of the upper and lower deadpoints. Therefore, the engine of the present invention is an unprecedented one-cycle engine in which all of the four pistons 2, 43 are arranged in opposition within the single engine body 1 (single cylinder).

The exhaust turbine 46 is driven by the exhaust gas discharged at both of the upper and lower deadpoints of the piston reciprocation, and the rotation of the exhaust turbine 46 is transmitted retrospectively to the engine body 1 through the transmission gear mechanism 51 (FIG. 20). Thus, the heat energy of the exhaust gas is effectively recovered to greatly increase the heat efficiency of the engine. Further, the exhaust turbine 46 functions also as a flywheel for the engine body 1, and the exhaust turbine can be rendered extremely light if the reduction ratio of the transmission gear mechanism 51 is set large. Moreover, the exhaust turbine 46 additionally works as a blower for sending the cooling air throughout the engine, as described below.

Figures 18, 19:
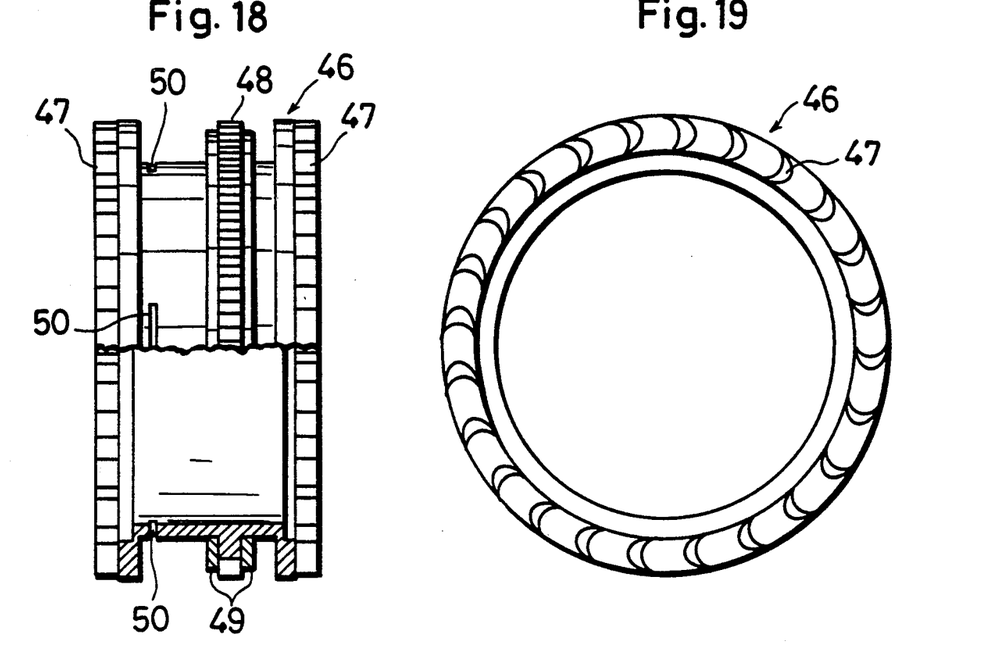
FIG. 18 is a side view, partially cut away, showing an exhaust turbine.
FIG. 19 is a front view of the turbine.

While the engine operates, the exhaust turbine 46 continues to rotate by the exhaust gas discharged at both deadpoints of the piston reciprocation. As a result, the exhaust turbine 46 causes external air to be sucked into the annular cooling chamber 63 through the cooling air intake ports 62 of the gear casing 52 and the cooling air inlet openings 50 of the turbine 46 (FIG. 18). Thus, the cooling air externally cools the engine body 1 around the main combustion chamber 4, and internally cools the turbine 46 itself. Obviously, the cooling efficiency is enhanced by the cooling fins 14 of the engine body. Further, the cooling air provides a pressure buildup within the cooling chamber 63, consequently establishing a pressure balance within the engine for preventing lubricant leakage which would otherwise occur due to pressure differences within the engine body.

The cooling air taken into the cooling chamber 63 flows further through the axial passages 11a of the engine body 1 and the radial passages 11b of the respective end lids 42 (see FIG. 2) into the respective auxiliary pistons 43. Then, the cooling air is discharged out of the auxiliary pistons 43 through the axial bores 44a, 44b of the output shaft 37 and drive shaft 38 (see FIGS. 12, 13, 16 and 17). Thus, the cooling air is also used for internally cooling the respective auxiliary pistons 43.

The above-described engine has the following advantages in addition to those already described in connection with the exhaust turbine 46.

(1) Since the engine body 1 itself rotates with the main pistons 2, the engine of the present invention requires no crank mechanism which may result in a considerable energy loss.

(2) Since the main pistons 2 reciprocate in the opposite directions to counteract each other, the engine vibration can be minimized.

(3) Since the main pistons 2 and the auxiliary pistons 43 are arranged coaxially within the single engine body (single cylinder) with the auxiliary pistons inserted in the main pistons, the space utilization within the engine body 1 can be maximized. In other words, the engine of the present invention can be rendered compact in spite of the fact that it incorporates four pistons to provide three combustion chambers in a single cylinder.

(4) Since the engine of the present invention is a one-cycle engine wherein explosive combustion takes place at both deadpoints of piston reciprocation, the engine output per unit cylinder volume can be greatly increased as compared to a conventional engine wherein explosive combustion occurs only at the upper deadpoint of piston reciprocation.

(5) Since the gas within the respective combustion chambers 4, 5 are elastically compressed at both deadpoints of piston reciprocation, the elastic restoration force of the compressed gas can be effectively utilized for assisting piston reciprocation. Thus, the kinetic energy loss of piston reciprocation can be minimized.

(6) Since the wirings 13a, 13b for the respective ignition plugs 12a, 12b are passed through the axial passages 11a of the engine body 1 and the radial passages 11b of the end lids 42, the arrangement of the wirings 13a, 13b does not hinder mounting of the exhaust turbine 46 which rotates differently from the engine body and the end lids.

Figure 22:
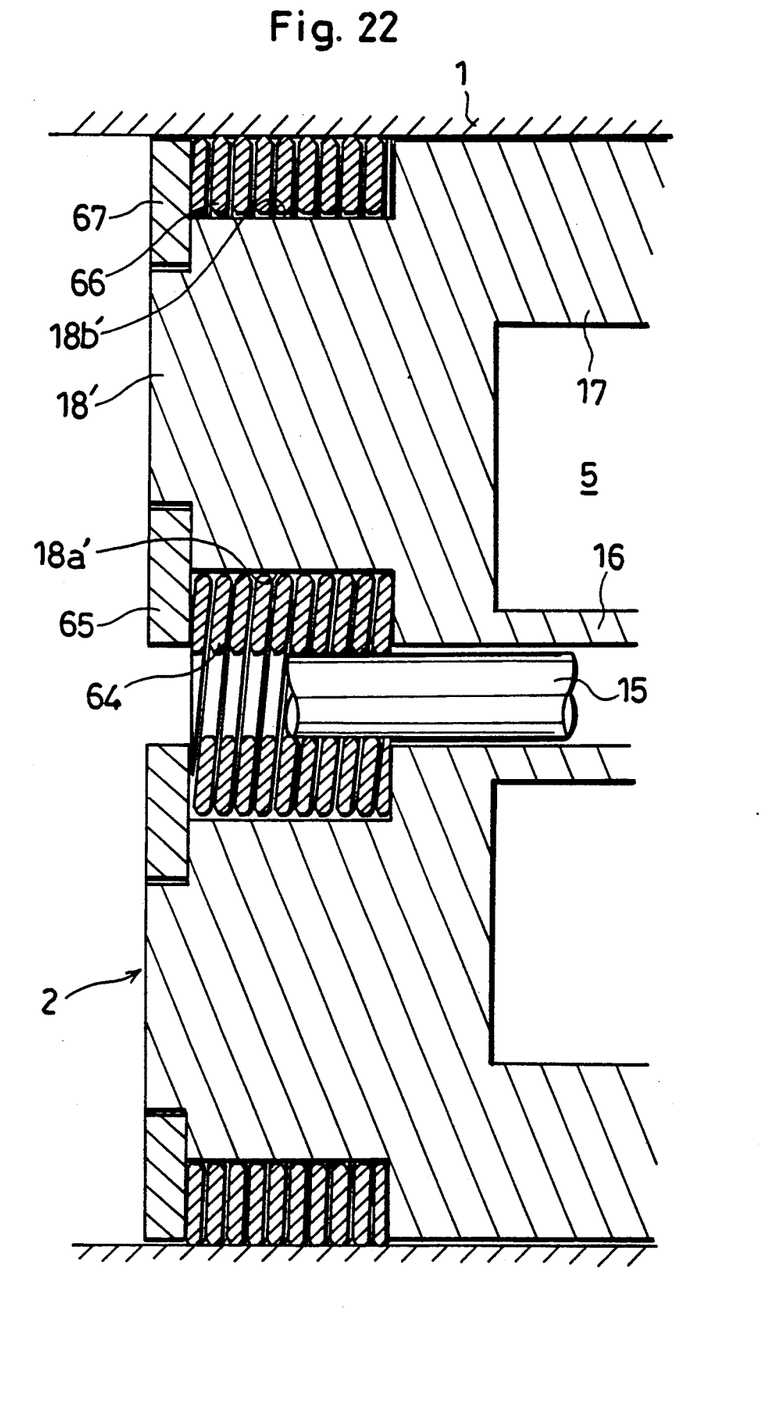
FIG. 22 is an enlarged sectional view showing a modified main piston.

As shown in FIG. 22, each of the main pistons 2 may be made to have a modified piston head 18' carrying an inner piston ring 64 and an outer piston ring 65. These piston rings are specially designed for the main piston used in the engine of the present invention.

Specifically, the inner piston ring 64 is made of a coil spring whose inner diameter is initially smaller than the outer diameter of the lubricant supply pipe 15 but expanded, at the time of mounting, for slidably fitting on the pipe 15. When expanded and mounted, the inner coil-spring piston ring 64 is received in a central recess 18a' of the piston head 18' and held in place by a retainer ring 65 attached to the piston head.

Similarly, the outer piston ring 65 is also made of a coil spring whose outer diameter is initially larger than the inner diameter of the engine body 1 but contracted, at the time of mounting, for slidably fitting in the engine body. When contracted and mounted, the outer coil-spring piston ring 65 is received on an annular shoulder 18b' of the piston head 18' and held in place by another retainer ring 67 attached to the piston head.

The use of the coil-spring piston rings 64, 64 is preferred in that they provide reliable gas tightness by a labyrinth sealing function while retaining lubricant oil by capillary action for smooth piston reciprocation. Obviously, one or both of the inner and outer coil spring piston rings 64, 65 may be replaced by other known piston rings.

Figure 23:
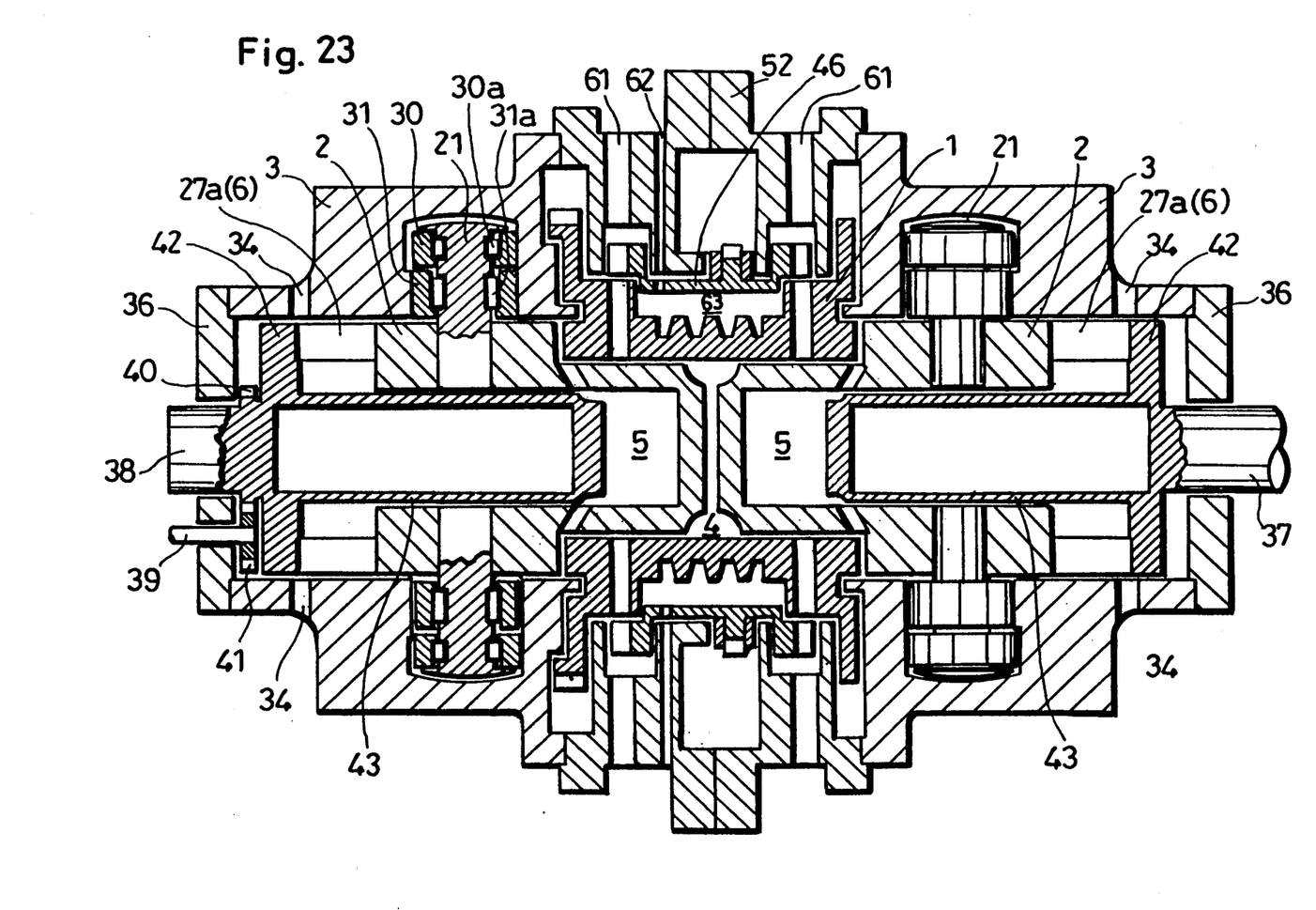
FIG. 23 is a sectional view similar to FIG. 1 but showing another engine according to the present invention.

FIG. 23 shows a modified engine wherein the lubricant supply pipe 15 provided in the engine of the foregoing embodiment is omitted. Such an arrangement enables simplification of the structure and is particularly recommended for a small size engine. If this simplified arrangement is employed, it is preferable to provide roller bearings 30a, 31a for the respective rollers 30, 31.

Figure 24:
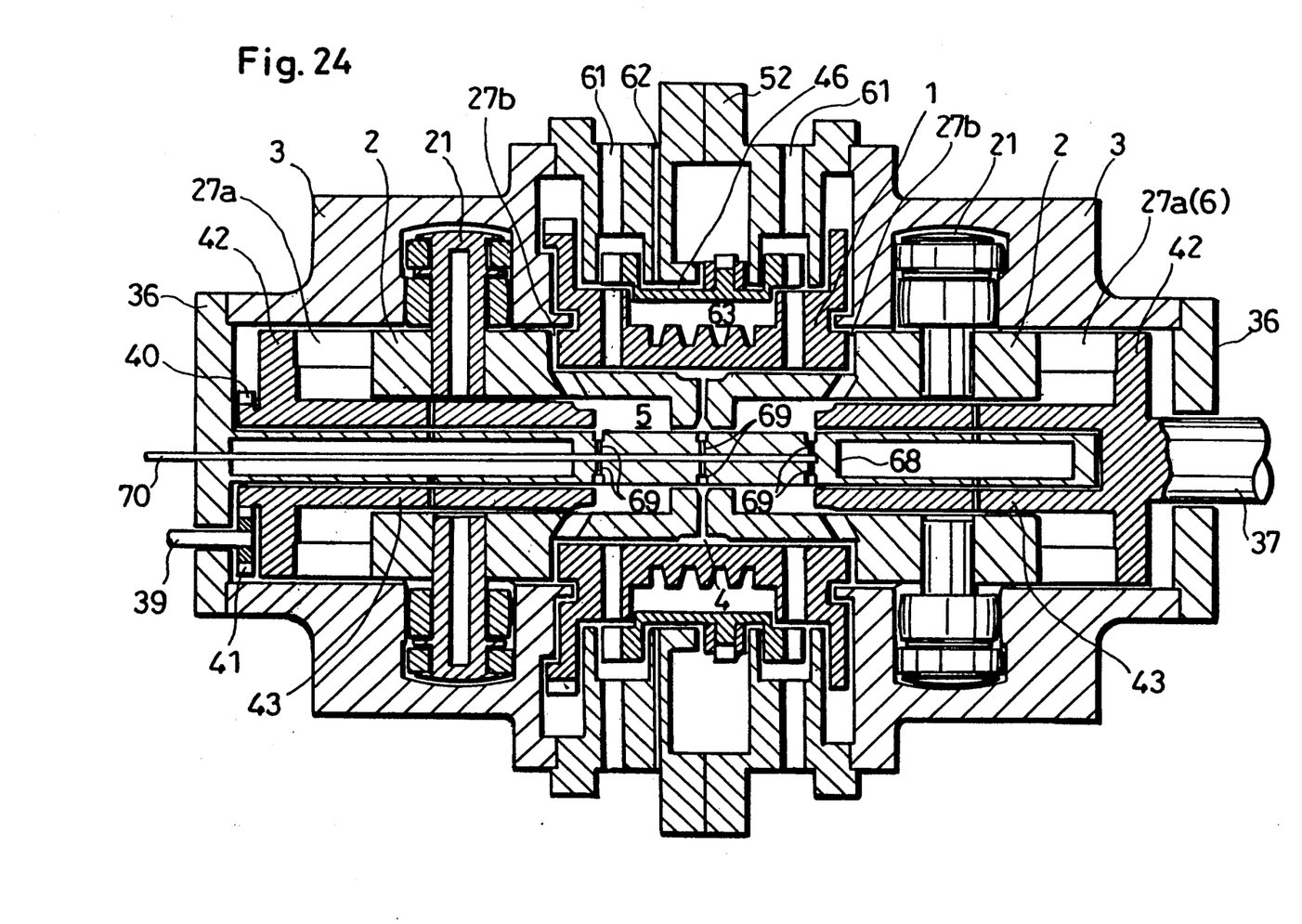
FIG. 24 is a sectional view also similar to FIG. 1 but showing a further engine according to the present invention.

FIG. 24 shows another modified engine wherein a mounting shaft 68 is fixed to one closure plate 36 to extend coaxially through the respective pistons 2, 43. The mounting shaft 68 is provided with three pairs of fuel injectors 69 in corresponding relation to the respective combustion chambers 4, 5, and the injectors 69 are connected to a liquid fuel supply line 70. The details of the fuel injectors 69 and their associated parts are fully described in U.S. Pat. No. 5,133,305 of the same inventors.

The modified engine of FIG. 24 operates as a diesel engine wherein explosive combustion within the respective combustion chambers 4, 5 is initiated by spontaneous ignition of the air-fuel mixture under high compression. Thus, no ignition plug is required in such an engine. Further, since the fuel is supplied from the fuel injectors 69, the respective gas supply chambers 27a, 27b need only to supply compressed air (instead of an air-fuel mixture) into the respective combustion chambers 4, 5.

Obviously, a plurality of engines according to the present invention may be connected in one or plural series. Alternatively, a plurality of engines according to the present invention may be arranged at the respective corners of a polygon, and the main output shafts of the respective engines may be rotationally coupled by gears.

The present invention being thus described, it is obvious that the same may be varied in many ways. For instance, the exhaust turbine 46 together with the transmission gear mechanism 51 may be omitted. Such variations are not to be regarded as a departure from the spirit and scope of the invention, and all such modifications as would be obvious to those skilled in the art are intended to be included within the scope of the following claims.

We claim:

1. An internal combustion engine comprising:
   a rotary engine body having a piston housing bore;
   an axially opposed pair of hollow main pistons disposed within the bore of the engine body to define a main combustion chamber between the pair of main pistons, the main pistons being rotatable with the engine body but slidably reciprocatable between upper and lower deadpoints relative to the engine body, the main pistons respectively carrying cam follower means extending transversely through the engine body;

hollow cam carrier means rotatably receiving the engine body, the cam carrier means internally having a pair of curved cam grooves receiving the respective cam follower means of the main pistons for causing the main pistons to make one full rotation with the engine body as the main pistons make two reciprocations;

a pair of axially fixed auxiliary pistons arranged on both sides of the main combustion chamber, the auxiliary pistons being inserted into the respective main pistons to define a pair of auxiliary combustion chambers within the respective main pistons;

gas supply means for supplying compressed gas alternately into the main combustion chamber and into the auxiliary combustion chambers; and exhaust means for allowing exit of exhaust gas alternately from the main combustion chamber and from the auxiliary combustion chambers.

2. The engine according to claim 1, wherein the exhaust means comprises two annular series of main exhaust ports formed in the engine body, the respective series of main exhaust ports communicating alternately with the main combustion chamber and with the auxiliary combustion chambers, the main exhaust ports being curved to impart whirling motion to the exhaust gas upon passage through the main exhaust ports for assisting rotation of the engine body.

3. The engine according to claim 2, wherein the exhaust means further comprises auxiliary exhaust ports formed in the respective main pistons for establishing communication between the auxiliary combustion chambers and the main exhaust ports when the main pistons are nearly at the upper deadpoint, the main combustion chamber communicating directly with the main exhaust ports when the main pistons are nearly at the lower deadpoint.

4. The engine according to claim 2, further comprising:

an exhaust turbine rotated around the engine body by the exhaust gas, the turbine having two annular series of turbine blades in corresponding relation to the respective annular series of main exhaust ports; and a transmission gear mechanism for transmitting rotation of the turbine to the engine body to assist rotation thereof.

5. The engine according to claim 4, further comprising:

an annular cooling chamber formed between the exhaust turbine and the engine body;

cooling air intake means for introducing external air into the cooling chamber under the action of the exhaust turbine; and passage means including axial passages formed in the engine body, the axial passages communicating with the cooling chamber and respective interior spaces of the auxiliary pistons;

whereby the external air introduced as cooling air into the cooling chamber cools both the engine body and the turbine, the cooling air further cooling the auxiliary pistons.

6. The engine according to claim 5, wherein the engine body is externally formed with cooling fins directly facing the cooling chamber.

7. The engine according to claim 5, further comprising ignition plugs respectively for the main and auxiliary combustion chambers, the ignition plugs being connected to wirings which extend in selected ones of the axial passages.

8. The engine according to claim 1, wherein the gas supply means comprises:

main gas suction ports formed in the cam carrier means axially outwardly of the respective cam grooves;

auxiliary gas suction ports formed in the cam carrier means axially inwardly of the respective cam grooves;

main gas supply chambers which are compressed by the respective main pistons brought toward the lower deadpoint but which communicate with the main gas suction ports when the main pistons are nearly at the upper deadpoint;

auxiliary gas supply chambers which are compressed by the respective main pistons brought toward the upper deadpoint but which communicate with the auxiliary suction port when the main pistons are nearly at the lower deadpoint;

main gas supply passage means for supplying the compressed gas from the respective main gas supply chambers into the main combustion chamber when the main pistons approach the lower deadpoint; and auxiliary gas supply ports formed in the respective main pistons for supplying the compressed gas from the respective auxiliary gas supply chambers into the respective auxiliary combustion chambers when the main pistons approach the upper deadpoint.

9. The engine according to claim 8, wherein the engine body is formed with guide slots while the respective main pistons have guide projections slidably fitted in the respective guide slots, each of the guide slots being divided by a corresponding one of the guide projections into two slot sections, each of the main gas supply chambers including one of the two slot sections, each of the auxiliary gas supply chambers including the other slot section.

10. The engine according to claim 1, wherein each of the main pistons has a piston head provided with an outer piston ring, the outer piston ring being made of a coil spring having an initial outer diameter which is slightly larger than a diameter of the piston housing bore of the engine body, the coil spring being diametrically contracted for fitting in the piston housing bore of the engine body.

11. The engine according to claim 1, further comprising lubricant supply pipe means extending coaxially through the main and auxiliary pistons for supplying lubricant radially outward under centrifugal force.

12. The engine according to claim 11, wherein each of the main pistons has a piston head provided with an inner piston ring, the inner piston ring being made of a coil spring having an initial inner diameter which is slightly smaller than an outer diameter of the lubricant supply pipe means, the coil spring being diametrically expanded for fitting on the lubricant supply pipe means.

13. The engine according to claim 1, wherein the gas supply means supplies an air-fuel mixture under compression alternately into the main combustion chamber and into the respective auxiliary combustion chambers.

14. The engine according to claim 1, wherein the gas supply means supplies compressed air alternately into the main combustion chamber and into the respective auxiliary combustion chambers, the engine further comprising fuel supply means for supplying a fuel into the main and auxiliary combustion chambers.

* * * * *